Sept. 22, 1959　　　H. H. EWALD　　　2,905,401
WINDING APPARATUS
Filed Feb. 28, 1955　　　　　　8 Sheets-Sheet 1
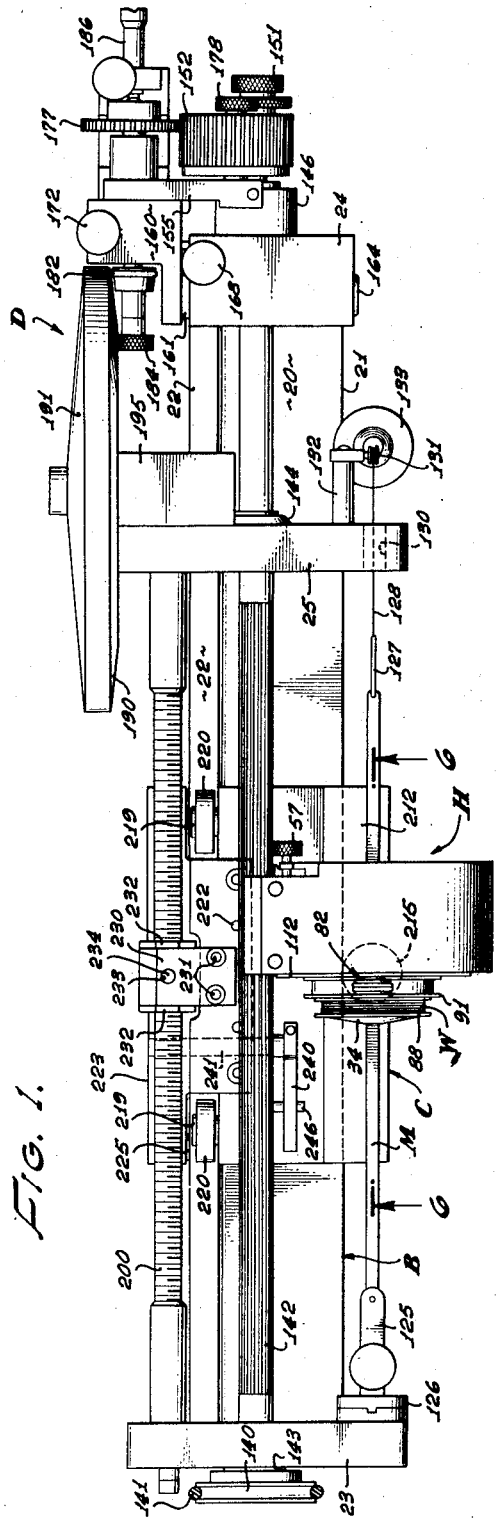
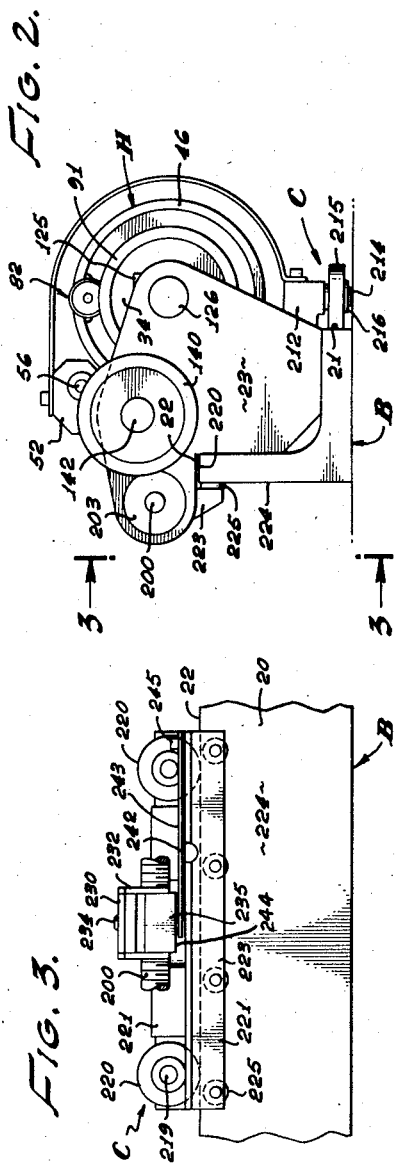
HOWARD H. EWALD
INVENTOR.
BY Henry Hayman
ATTORNEY Sept. 22, 1959     H. H. EWALD     2,905,401
WINDING APPARATUS
Filed Feb. 28, 1955     8 Sheets-Sheet 2
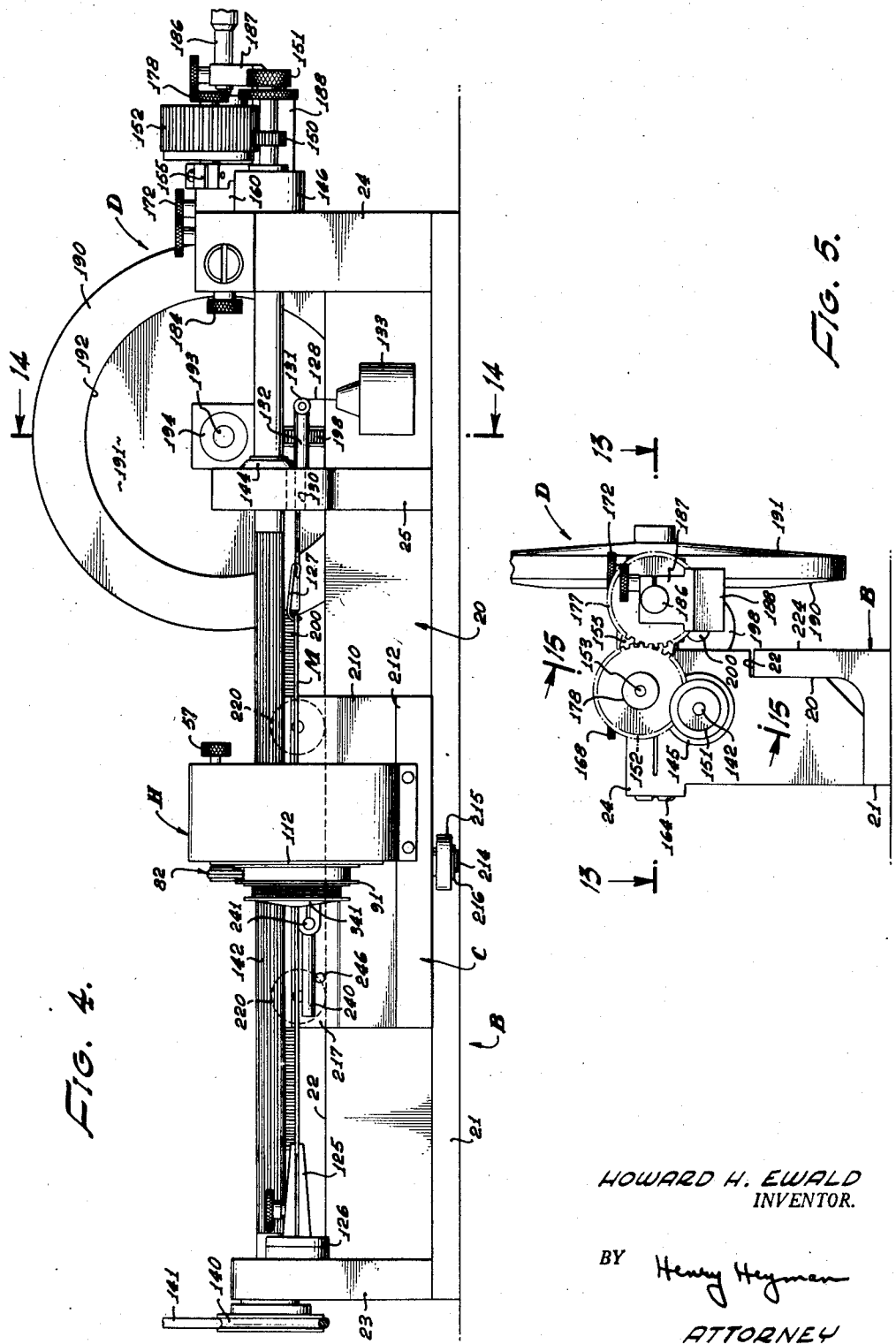
HOWARD H. EWALD
INVENTOR.
BY Henry Heyman
ATTORNEY

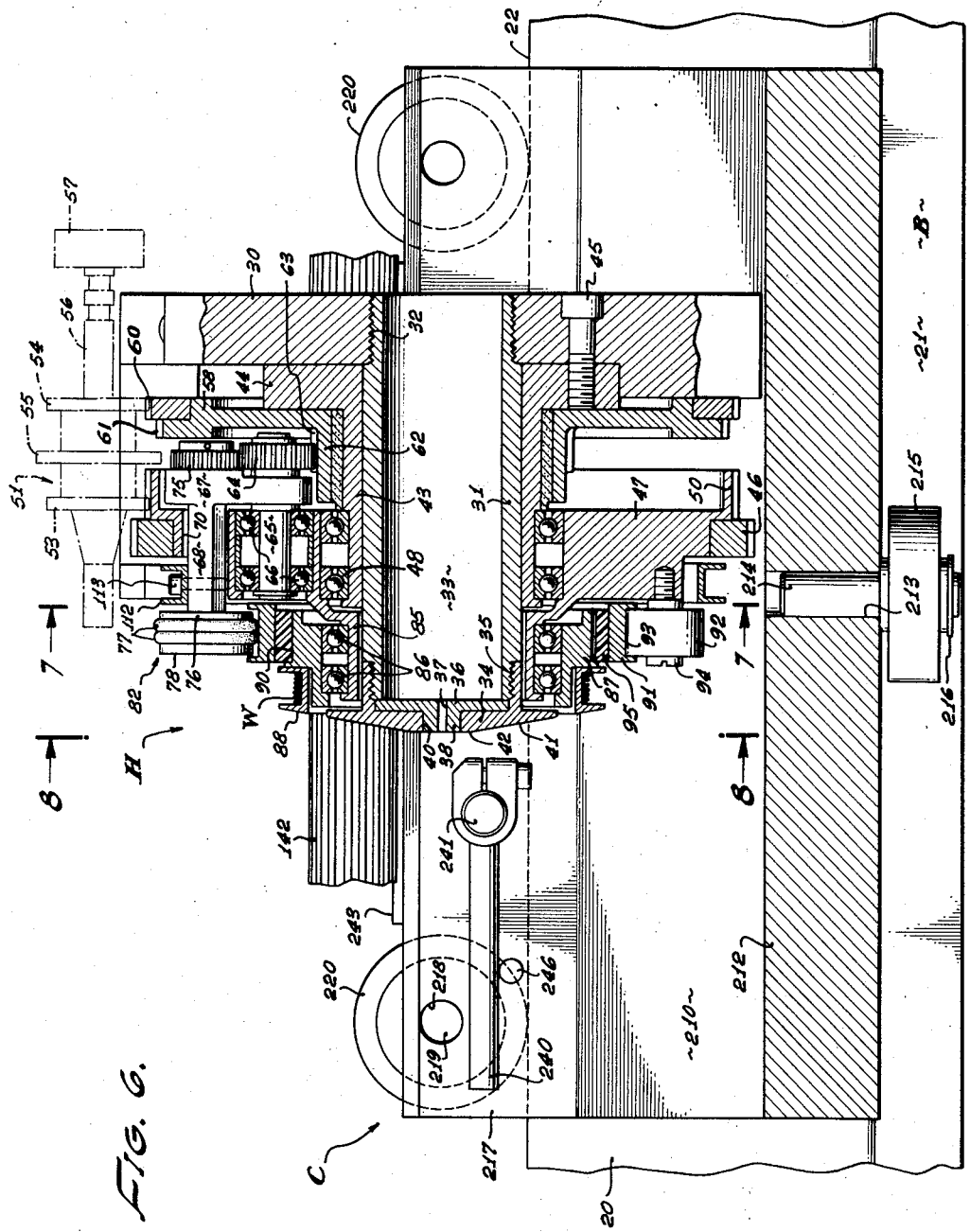

Sept. 22, 1959     H. H. EWALD     2,905,401
WINDING APPARATUS

Filed Feb. 28, 1955     8 Sheets-Sheet 4

HOWARD H. EWALD
INVENTOR.

BY Henry Hyman

ATTORNEY

Sept. 22, 1959        H. H. EWALD        2,905,401
WINDING APPARATUS
Filed Feb. 28, 1955        8 Sheets-Sheet 5
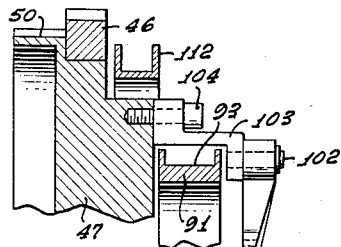
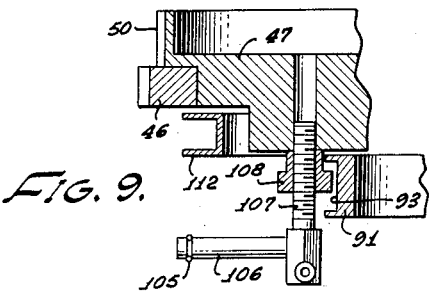
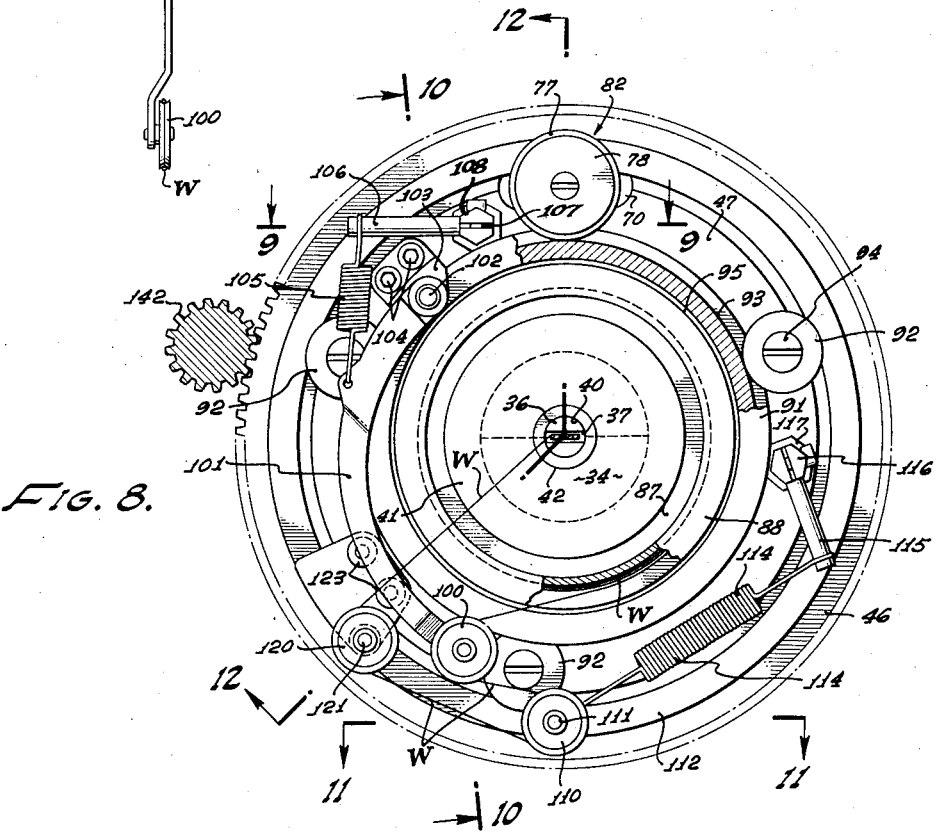
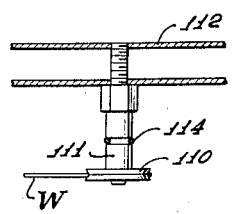
HOWARD H. EWALD
INVENTOR.
BY Henry Heyman
ATTORNEY

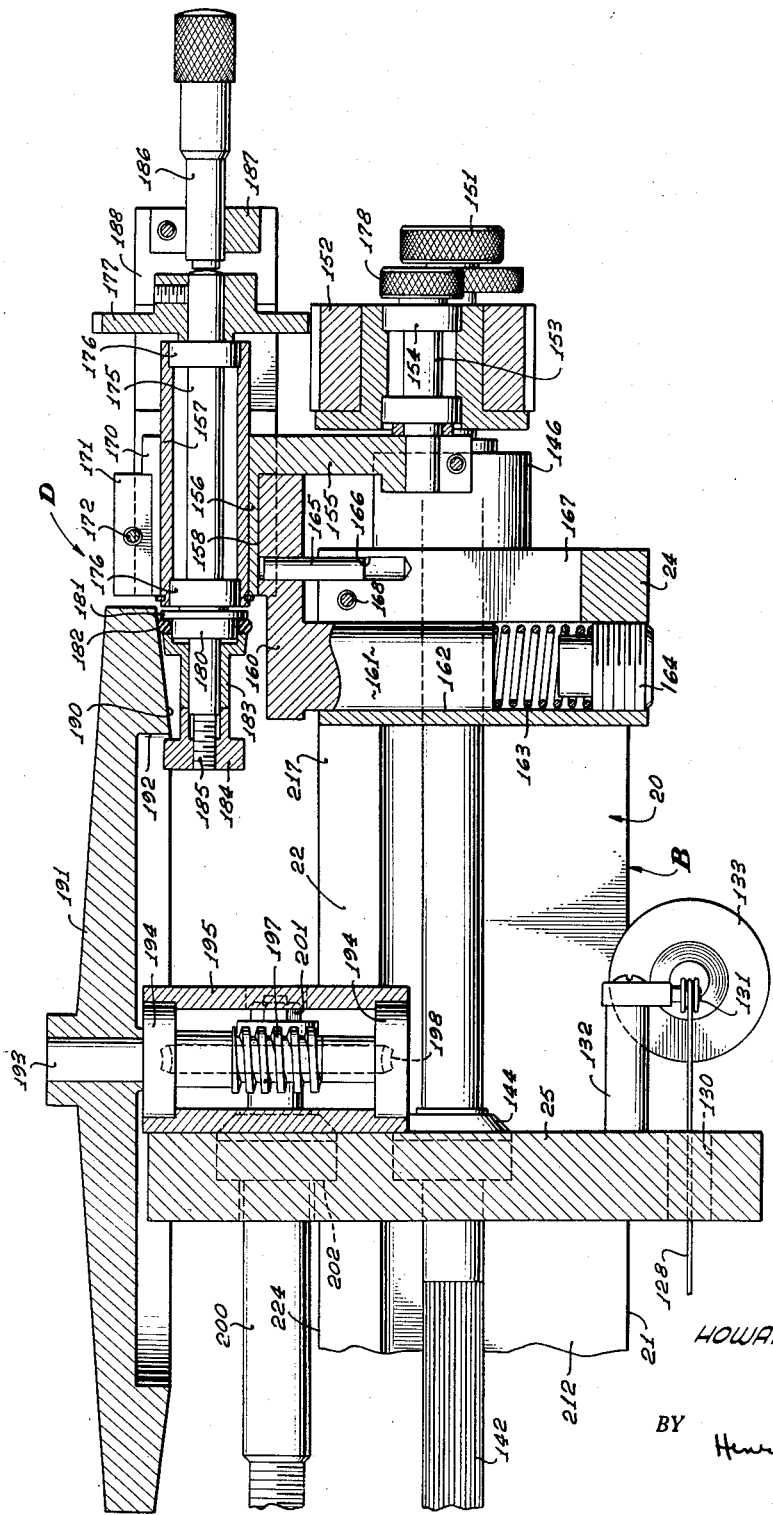

Sept. 22, 1959     H. H. EWALD     2,905,401
WINDING APPARATUS
Filed Feb. 28, 1955                                            8 Sheets-Sheet 8
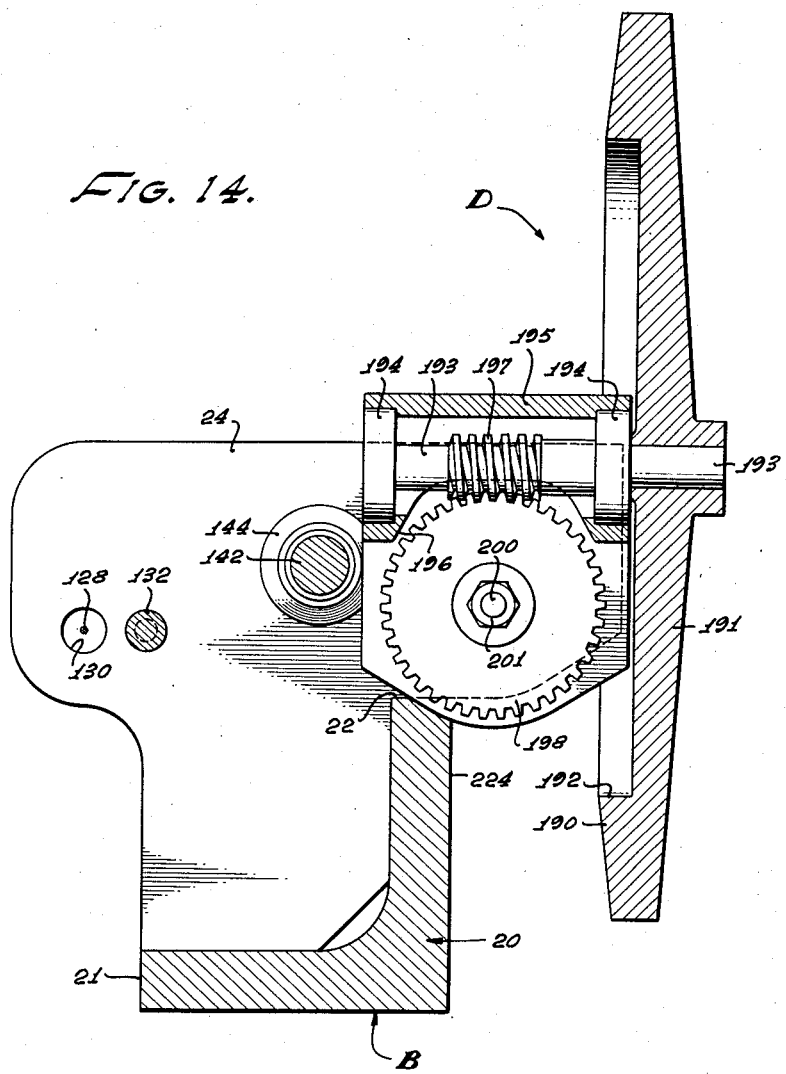
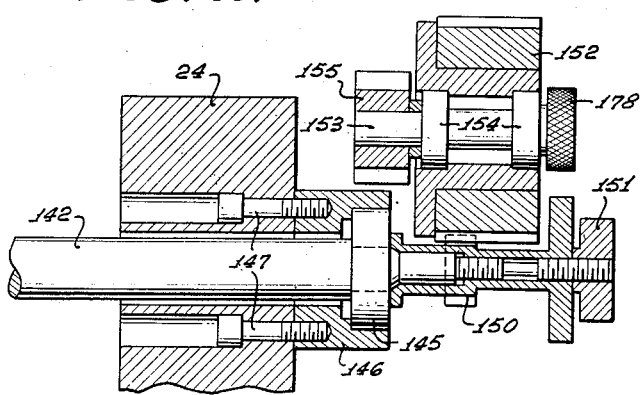
HOWARD H. EWALD
INVENTOR.
BY Henry Hyman
ATTORNEY

United States Patent Office 2,905,401
Patented Sept. 22, 1959

2,905,401

WINDING APPARATUS

Howard H. Ewald, Los Angeles, Calif., assignor to Hughes Aircraft Company, Culver City, Calif., a corporation of Delaware Application February 28, 1955, Serial No. 490,768

4 Claims. (Cl. 242—7)

The present invention relates generally to a winding apparatus and relates more particularly to an apparatus for accurately, rapidly and efficiently winding a stranded material about a support.

In the manufacture of electrical potentiometers and the like, wherein variable resistance elements are employed, it is necessary accurately to apply, as by winding, a stranded material such as wire, for example, about a support material. The support material may take the form of an electrically non-conductive strip that is generally relatively flat with a rectangular cross-section. Contemporary trends have indicated the need, in many instances, for extreme miniaturization of various electrical and electronic components utilizing resistance elements, with the associated requirement, relative to the use of stranded material that is very small in diameter, often in the nature of .0004". It is customary practice to employ an enamel or lacquer coating on the exterior surface of the stranded material, in order to insulate adjacent windings one from the other. Obviously, such insulatory coating results in the over-all diameter of the stranded material being substantially increased.

In order that accuracy in the operation of potentiometers and the like may be maintained, it is extremely important that adjacent windings of wire about a support material or card be maintained with extremely accurate spacing between the adjacent windings and, in some instances, the various windings must be placed closer together than would be allowed by the thickness of two adjacent layers of an insulating coating. Accordingly, in some instances, it has been necessary to employ non-coated wire and to wind this wire about a support material with extreme accuracy in order to control and maintain the spacing between adjacent wires and in order that there may be no electrical connections therebetween.

In prior like arrangements, the winding of wire about a support material has been accomplished in manners similar to that to be recited hereinafter. However, due to the particular construction of such prior like devices, the accuracy of the windings about the support material, the pitch of the windings and the spacing maintained between windings were not always possible to maintain. Additionally, in prior devices, in order that such extreme accuracy might be approached, devices utilized to wind wire about a support material have operated relatively slowly, thus making the end product expensive and naturally requiring considerable time in the application of the windings to the support material.

Accordingly, it is one important object of the present invention to provide a novel apparatus for winding wire about a support material, wherein means are provided for accurately controlling the pitch and spacing between adjacent windings of the wire about the support material.

Another important object of the present invention is to provide an apparatus for winding wire about a support material, wherein novel wire winding guide means are employed, together with a novel support and guide arrangement for the winding guide means.

A further object of the present invention is to provide novel means for varying the pitch and spacing relative to adjacent windings of wire about a support material.

A still further important object of the present invention is to provide a winding head for use in conjunction with a winding apparatus, wherein novel means are provided to maintain constant tension upon wire being wound about a support material, in response to and in accordance with tension requirements at the point of application of the wire to the support material.

Still another important object of the invention is to provide an apparatus for winding wire about a length of support material wherein novel means are included for enabling operation and driving of the apparatus with minimum power requirements.

Another object of the invention is to provide a winding apparatus employing novel speed ratio changing structure enabling small increment adjustments of the pitch of and spacing between adjacent wire windings about a support material.

Other and further important objects of the present invention will become apparent from the disclosures in the following detailed specification, appended claims and accompanying drawings, wherein:

Figure 1 is a top plan view of the present winding device;

Fig. 2 is a left end view thereof;

Fig. 3 is a fragmentary rear view of a portion of the carriage support mechanism, as taken substantially as indicated by line 3—3, Fig. 2;

Fig. 4 is a front elevational view of the winding apparatus;

Fig. 5 is a right end view thereof;

Fig. 6 is an enlarged sectional view through the winding head of the present winding apparatus, as taken substantially as indicated by line 6—6, Fig. 1;

Fig. 8 is a face view of the winding head, as taken substantially as indicated by line 8—8, Fig. 6;

Fig. 9 is a fragmentary sectional view through one portion of the winding head tension mechanism, as taken substantially as indicated by line 9—9, Fig. 8;

Fig. 10 is a fragmentary sectional view showing a portion of the wired tensioning means associated with the winding head, as taken substantially as indicated by line 10—10, Fig. 8;

Fig. 11 is a detail sectional view showing another portion of the tension mechanism associated with the winding head, as taken substantially as indicated by line 11—11, Fig. 8;

Fig. 13 is an enlarged sectional view through the variable speed driving mechanism utilized with the present winding apparatus, as taken substantially as indicated by line 13—13, Fig. 5;

Figure 7:
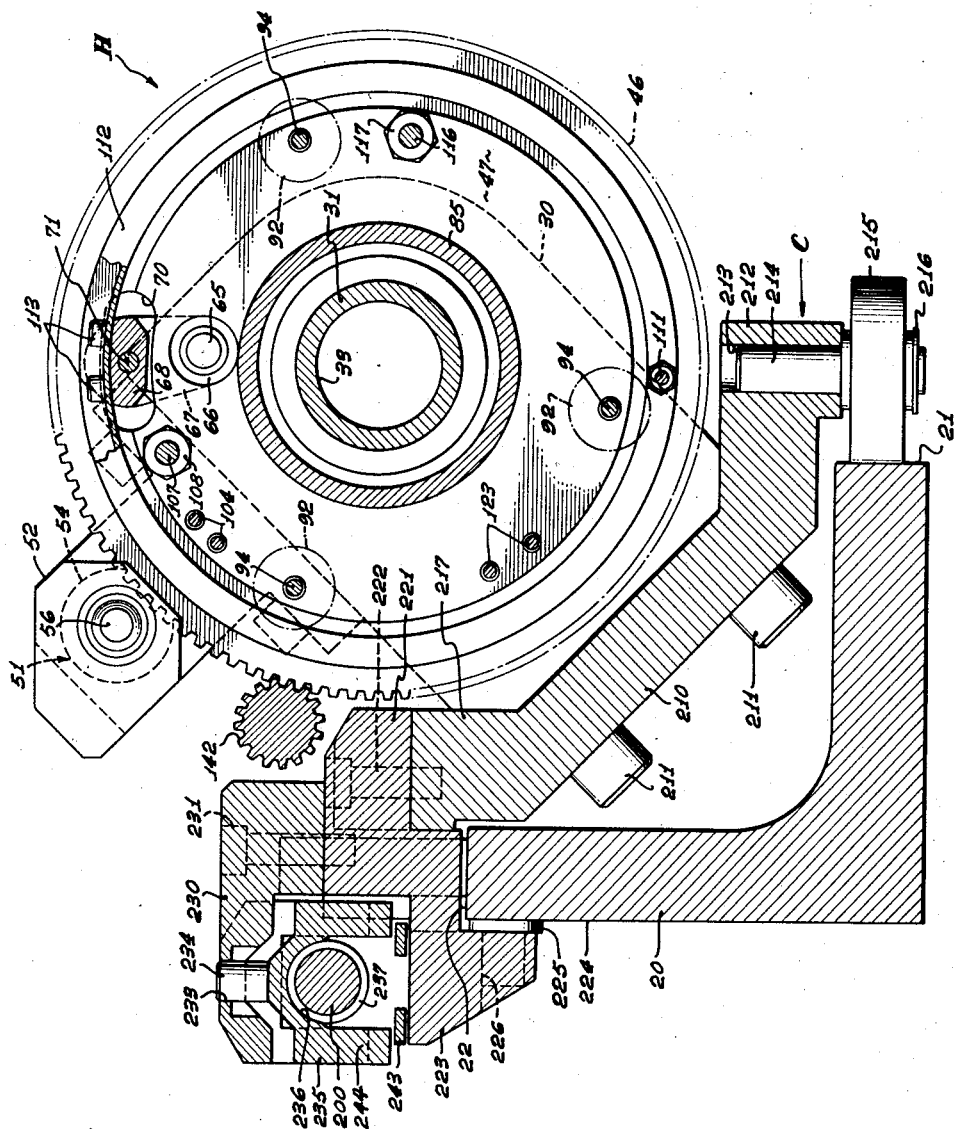
Fig. 7 is a transverse sectional view through a portion of the winding head, as taken substantially as indicated by line 7—7, Fig. 6.

Fig. 14 is a transverse sectional view on an enlarged scale showing further details of the variable speed driving mechanism, as taken substantially as indicated by line 14—14, Fig. 4; and Fig. 15 is an enlarged fragmentary sectional view through a quick change transmission arrangement utilized between the driving shaft and the variable speed mechanism, as taken substantially as indicated by line 15—15, Fig. 5.

With reference to the drawings, the winding apparatus of the present invention includes generally a base structure B; a winding head H, disposed for rotation and for longitudinal movement on the base structure B; a carriage C for the winding head H; and a variable speed driving mechanism D.

The base B includes a longitudinally extending L-shaped guide and track member 20 which presents a forwardly directed guiding surface 21 and an upwardly directed guiding surface 22. One end of the guide member 20 has affixed thereto a vertically extending end member 23, while the other end of the member 20 is provided with a vertically extending support 24. A second support 25 is affixed to the member 20 and extends vertically therefrom, the support 25 being disposed intermediate the member 23 and the support 24 and adjacent the support 24.

With reference primarily to Figs. 6, 7, 8, and 12, the winding head H includes a vertically extending back plate 30 that is fixed to and disposed upwardly from the carriage C. A stationary non-rotatable spindle 31 threadably engages the back plate 30, as at 32. The spindle 31 has an axial bore 33 that is open at one end with the other end thereof being closed by means of a wire guide fitting 34 that threadably engages the spindle 31, as at 35.

A pair of semicircular support material guide members 36 are disposed between one end of the spindle 31 and the wire guide member 34, there being a rectangular space 37 provided therebetween. The guide members 36 have axially extending portions 38 that are adapted for disposition within an annular opening 40 in the wire guide member 34. The wire guide member 34 has a forward conical face 41 that is provided with an annular bend 42 adjacent the opening 40.

The spindle 31 has a support shaft 43 disposed on the outer annular surface thereof, this support shaft having an outwardly extending flange 44. The flange 44 is secured to the back plate 30 by means of suitable screws 45. A main driving gear 46 is carried by a hub 47 that is journalled on bearings 48 disposed on the outer surface of the shaft 43. The periphery of the hub 47 is also adapted to carry a transfer gear 50 that is adapted for cooperation with a cluster gear 51. The cluster gear 51 is mounted for rotation in a U-shaped bracket 52, Fig. 7, that is disposed from the back plate 30, and has a gear 53 that is engageable with the gear 50, a forward driving gear 54 and a reverse driving gear 55. The cluster gear arrangement 51 is slidable axially on a shaft 56 that is carried by the bracket 52, through use of a suitable handle or knob arrangement 57. The forward driving gear 54 is adapted for engagement with a brake driving gear member 58 through gear teeth 60, while the reverse driving gear 55 is adapted for cooperation with the brake driving gear member 58 through gear teeth 61. The brake driving member 58 has an axially extending portion 62 that has outwardly directed gear teeth 63 that are adapted to drive an idler gear 64 that is in turn mounted on a shaft 65. The shaft 65 is journalled in bearings 66 that are supported in the hub portion 47 of the main driving gear 46.

The axis of the shaft 65 is parallel to the axis of the spindle 31, this shaft being spaced radially outwardly from the center of rotation of the head. The shaft 65 also serves to support, in a pivotal manner, a lever 67 that extends generally radially outwardly therefrom. In this connection, it is to be noted that the lever 67, as seen in Fig. 7, has an outer end portion that is disposed at a slight angle to a radian from the axis of the spindle 31, the purpose of which to be hereinafter more fully described. A generally rectangular bar 68 is formed integrally with and extends in an axial direction laterally from the lever 67 and through a circumferentially elongated opening 70 in the main driving gear hub 47.

Figure 12:
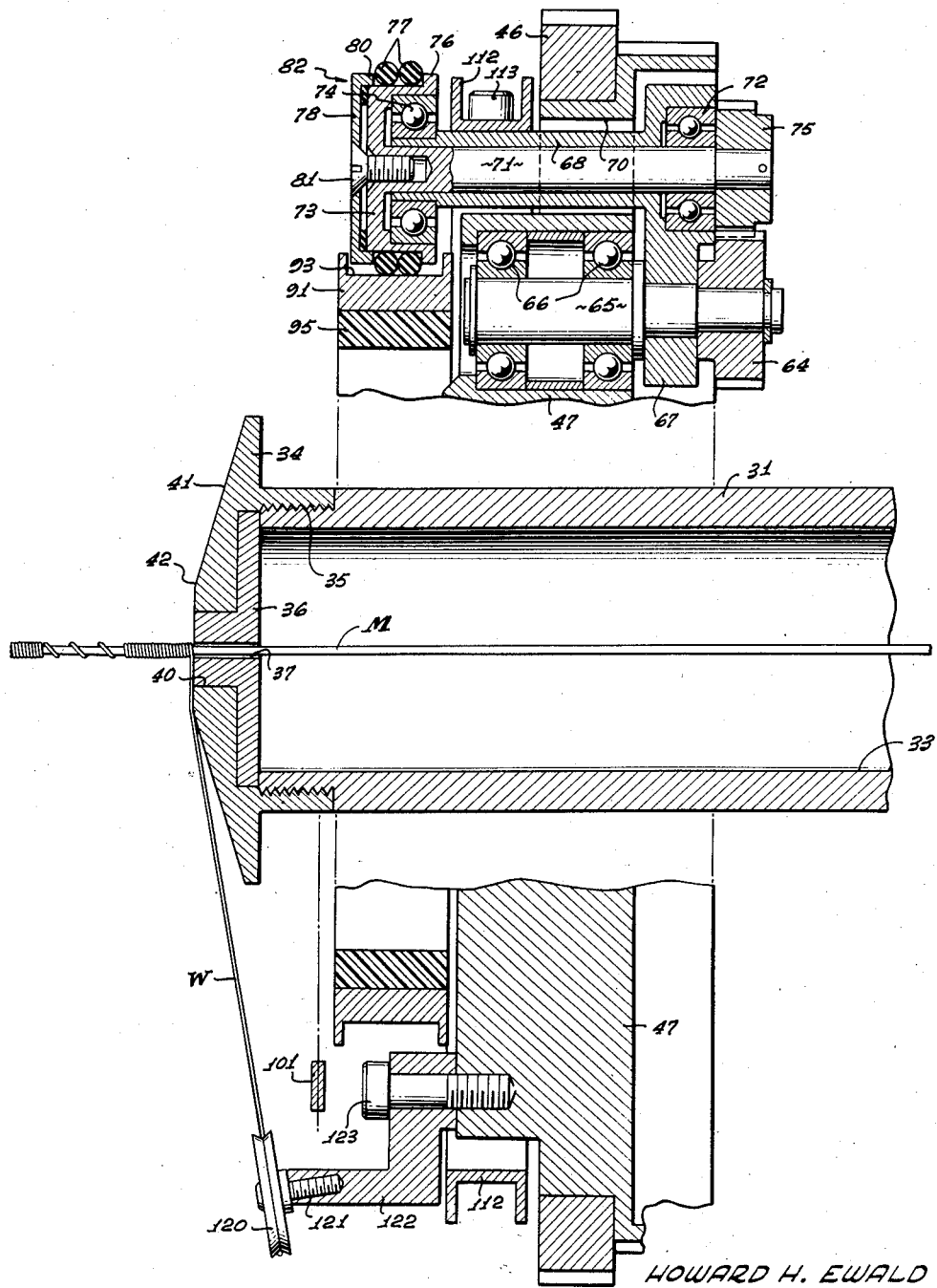
Fig. 12 is a further enlarged fragmentary sectional view showing details of the wire braking mechanism associated with the winding head, as taken substantially as indicated by line 12—12, Fig. 8.

With reference primarily to Fig. 12, the bar 68 is adapted for reception of a shaft 71 that is rotatably journalled in a bearing 72 carried by the outer end of the lever 67. The outer end of the shaft 71 is provided with a cup-shaped enlargement 73 that is journalled on a bearing 74 carried by an outer end of the bar 68. The inner end of the shaft 71 is fitted with a gear 75 that is adapted for cooperation with the idler gear 64. The cup-shaped enlargement 73 on the outer end of the shaft 71 has a radially extending flange 76 formed on the inner axial end thereof. A pair of O-rings 77 are adapted for disposition about the outer surface of the enlargement 73 and for retention thereon by means of a retaining ring 78 having an axially extending portion 80. The retaining ring is positioned by means of a screw 81 that is threadably disposed in a bore in the outer end of the shaft 71.

It may thus be seen that upon rotation of the main driving gear 46, as by a means to be hereafter more fully described, the hub 47 thereof will be rotated together with the gear 50. With the forward and reverse driving cluster gear 51 being positioned as shown by the dotted lines in Fig. 6, the forward driving gear 54 will be engaged with the teeth 60, thus to drive the brake driving gear member 58 and idler gear 64. This action will drive the gear 75 and shaft 71 to drive the frictional engagement wheel, as indicated generally at 82 and defined by the cup-shaped member 73 together with the O-rings 77 and retainer ring 78. Through this particular gear arrangement, it is to be noted that the frictional engagement member 82 is driven in the same direction as that of the main driving gear 46. However, it is to be further noted that the speed of rotation of the frictional engagement member 82 will be slightly less than the speed of rotation of the main driving gear 46. When the cluster gear 51 is moved axially on the shaft 56, the gear 55 will mesh with the teeth 61, carried by the brake driving gear member 58, whereby to increase the speed of driving of the frictional engagement member 82. The purpose of this speed change arrangement will be hereafter more fully described.

The hub 47 of the main driving gear 46 has an axially extending annular portion 85 that is adapted to support bearings 86 on which is journalled a bobbin and brake support member 87. A ring-shaped bobbin 88 is disposed on an outer end of the member 87 with this bobbin being adapted for retention of a supply of wire W. The member 87 is also provided with an axially extending braking surface 90 that is disposed substantially axially adjacent the bobbin 88. It is to be noted that the member 87, together with the bobbin 88, is freely independently rotatably mounted on the extension 85 of the main driving gear hub 47 and that no positive rotary forces are applied directly thereto.

A braking ring 91 is positioned generally concentrically about and radially outwardly from the braking surface 90 of the member 87, and retained in this position by means of a plurality of guide rollers 92 that engage in a peripheral groove 93 of the ring 91. The rollers 92 are carried by screws 94 which threadably engage in openings in the outer face of the hub 47 of the main driving gear 46. The ring 91 is adapted to carry a layer of braking material 95 about the inner surface thereof. The rollers 92 support the ring 91 in such a manner as to permit slight radial movement of the ring 91 relative to the axis of the spindle 31. Thus, as shown in Fig. 6, the inner periphery of the braking material 95 is adapted for disposition in slight spaced relationship to the braking surface 90 of the member 87. Additionally, as shown in Figs. 6 and 12, the O-rings 77, of the frictional engagement member 82, are adapted for engagement and cooperation with the radially directed annular face of the groove 93 formed in the outer periphery of the braking ring 91, whereby to tend to drive the ring, by frictional engagement therewith and in a direction opposite from that of the main driving gear 46 and hub 47. Thus, the member 87 and bobbin 88 may be biased and/or driven in a direction also opposite from that of the main driving gear 46, by engagement of the frictional braking material 95 with the braking surface 90 on the member 87.

As shown primarily in Fig. 8, the wire W from the bobbin 88 is adapted to be drawn in a clockwise direction therefrom. The wire passes from the bobbin and over a guide pulley 100 that is carried on an end of a semicircular arm 101. The arm 101 is pivoted as at 102 to a bracket 103, this bracket being in turn fixed to the hub 47 of the main driving gear 46 by means of suitable screws 104. The arm 101 has affixed thereto a relatively light tension spring 105, the other end of which is connected to a spring tensioning arm 106 that is adjustably supported on a shaft 107 and maintained in position by means of a lock nut 108. The shaft 107 is adapted threadably to engage the hub 47 of the main driving gear 46. The pulley 100 serves to maintain constant general tension upon the wire being delivered from the reel 88; however, this tension is minute and controlled by the light tension induced by the spring 105.

From the pulley 100, the wire W passes about a second pulley 110 that is mounted on a shaft 111, that is in turn connected to a brake control lever arrangement defined by an annular brake control ring 112. The ring 112 is disposed adjacent the outer face of the hub 47 of the main driving gear 46 and is spaced radially and longitudinally therefrom. The ring 112 is further generally U-shaped in cross-section and is attached to a longitudinal upper surface of the bar 68 by means of a pair of screws 113, Fig. 7. The ring 112, together with the shaft 111 and pulley 110 is biased in a circumferential direction by means of a low rate (as compared with the tension of the spring 105) tension spring 114 that has one end connected to the shaft 111 and the other end connected to a spring tension adjusting arm 115. The arm 115 is similar in construction to the arm 106 previously discussed, is shown in detail in Fig. 9, and is connected to a shaft 116 that threadably engages the hub 47 of the main driving gear 46, with the relative tensioning position thereof being set by means of a lock nut 117. The tensions of the springs 105 and 114 are such as to approximately equal the required optimum tension to be applied to the wire W.

After passing about the pulley 110, the wire W passes about a fixed guide pulley 120 that is journalled on a shaft 121 that threadably engages a bracket 122. The bracket 122 is secured to the hub 47 by means of suitable screws 123. As shown in Fig. 12, the pulley 120 is disposed at a slight angle, approximately 7°, to a plane normal to the axis of rotation of the spindle 31, whereby to guide the wire W therefrom and to a strip of supporting material M that is disposed within the rectangular opening 37 defined between the guides 36 in the spindle of 31. The wire W is adapted to pass over the slight bend 42 on the face 41 of the spindle head 34, to thereafter be deflected in a radial direction for winding about the material M.

In regard to the support material M, it is to be noted that the material illustrated in the drawings is in the form of an elongated strip that is generally rectangular in cross-section. However, it is to be understood that this material may be of any cross-sectional configuration and that the guide members 36 may be replaced with other guide members in order that other configurations of support material may be used and guided thereby. While the support material M is shown as being linear along edges thereof, it is to be understood that non-linear material may be used without departing from the spirit and scope of the present invention.

As shown primarily in Figs. 1 and 4, the support material M has one end supported by means of a clamp arrangement 125 that is adjustably secured, by means of a fitting 126, to the end support member 23 of the winding apparatus body B. The other end of the support material M is adapted to be affixed to a hook 127 from which a cable 128 extends. The cable 128 is adapted for free passage through an enlarged opening 130 in the intermediate support 25 and thereafter over a pulley 131 carried by a bracket 132. The end of the cable 128 is adapted to be affixed to a suitable weight 133 whereby to maintain constant tension upon the material M and to compensate for any elongation thereof during winding of wire about the support material.

As shown primarily in Figs. 1 and 4, the winding apparatus of the present invention is adapted to be driven through a pulley 140 as by a belt or the like 141. The pulley is operatively connected to a splined driving shaft 142 that has opposite ends thereof journalled in suitable bearings 143, 144, and 145. The bearing 143 is carried by the end support member 23 while the bearing 144 is carried by, as shown in Fig. 13, the intermediate support member 25. The bearing 145 is carried by an extension bracket 146 that is secured to the support 24 by means of suitable screws 147. The splined shaft 142 is adapted for engagement with the main driving gear 46 of the winding head H, whereby to rotate the winding head in the manner hereinbefore described.

One end of the shaft 142, as shown in Fig. 15, has a driving gear 150 removably secured thereto by means of a nut arrangement 151 that threadably engages a reduced diameter portion of the end of the shaft. The gear 150 is adapted for cooperation with an idler gear 152 that is rotatably journalled on a shaft 153 by means of bearings 154. The shaft 153 is carried by an arm 155 that has a longitudinally extending portion 156, that is in turn pivotally supported about a sleeve 157. The sleeve 157 is pivotally and longitudinally movable in the portion 156, which is in turn pivotally mounted in an opening 158 in a bracket 160. The bracket 160 has depended therefrom a transversely disposed shaft 161 that is adapted for slidable disposition in a bore 162 provided laterally through the support member 24. The compression spring 163 is also disposed within the bore 162 between an outer end of the shaft 161 and an adjustment screw 164 which threadably engages in the outer end of the bore 162. Movement of the shaft 161 inwardly and outwardly from the bore 162 is guided by means of a guide pin 165 that extends into an elongated opening 166 in the support member 24, the opening 166 being disposed parallel to the bore 162. One side of the support member 24 is slotted as at 167, there being a thumb screw 168 extending across the slot 167 whereby to permit locking of the shaft 161 in the bore 162. Additionally, the portion 156 of the arm 155 surrounding the sleeve 167 is slotted as at 170 and the bracket 160 is slotted as at 171, a thumb screw 172 being positioned across the slot 171 in order that this portion of the fitting 160 and the portion 156 may be clamped about the sleeve 157.

The sleeve 157 is adapted rotatably to support a shaft 175 through suitable bearings 176 disposed in each end thereof.

As shown in Fig. 13, the outer end of the shaft 175 is adapted to support a gear 177 that cooperates with the idler gear 152. The gear 177 is a fixed gear on the shaft 175 while the idler gear may be removed from the shaft 153 by means of a thumb screw arrangement 178, so as to permit variations in gear ratios by replacing both the idler gear 152 and the driving gear 150. The leftward end of the shaft 175 is provided with an enlargement 180 having a radially outwardly extending flange 181. A replaceable O-ring 182 is adapted for disposition about the enlargement 180 and for abutting relationship with the flange 181. The O-ring 182 is retained on the enlargement 180 by a retaining member 183 that is in turn secured in position by means of a thumb nut 184 that threadably engages a reduced diameter portion 185 of the shaft 175.

The axial end of the shaft 175, on which is mounted the gear 177, is adapted for engagement by a micrometer adjustment device 186 that is mounted in a split bracket 187 disposed upwardly from an extension 188 formed from the member 160. It may thus be seen that upon loosening the thumb screws 168 and 172, the position of the O-ring 182 may axially be changed by adjustment of the micrometer arrangement 186; and the lateral position thereof may be altered by movement of the shaft 161 within the bore 162 against the compression of the spring 163. A detailed description of this positioning feature will be hereafter more fully provided.

As shown primarily in Figs. 13 and 14, the O-ring 182, forming a portion of the variable ratio driving mechanism D, is adapted for cooperation with a conical face 190 formed adjacent the periphery of a variable ratio driving wheel 191. The wheel 191 has a recess 192 that is adapted for reception of the thumb nut 184 to prevent interference between this thumb nut and the driving wheel. The driving wheel 191 is secured to a shaft 193 that is rotatably journalled in bearings 194 which are carried by ends of a sleeve 195. The sleeve 195 is operatively connected to the intermediate support 25. As shown in Fig. 14, the underside of the sleeve 195 is cut away as at 196 and a worm 197, carried by the shaft 193 intermediate the bearings 194, extends through this cut away portion for engagement with a worm gear 198. The gear 198 is affixed to one end of a leadscrew 200, by means of a nut 201, with the leadscrew being journalled in a bearing 202 in the intermediate support member 25. The other end of the leadscrew 200 is journalled in a bearing 203, Fig. 2, in the end support member 23.

With reference primarily to Figs. 1, 4, 6, and 7, the carriage C, which serves to support the head H by means of the back plate 30, comprises an angularly disposed carriage member 210 to which the back plate 30 is attached by means of suitable bolts 211. The carriage member 210 has a horizontally extending portion 212, the longitudinal centeral area of which is provided with a vertical bore 213 in which a shaft 214 is disposed. The lower end of the shaft 214 is adapted rotatably to support a roller 215 that is retained thereon by means of a snap ring arrangement 216. It is to be noted that the axis of the shaft 214 lies in a vertical plane intersecting the axis of the spindle 31 of the winding head for a purpose to be hereinafter more fully described.

The carriage member 210 further has a vertically extending portion 217, the longitudinal ends of which are provided with transversely extending openings 218 in which are disposed shafts 219. The shafts 219 are adapted rotatably to support a pair of rollers 220. The bottom roller 215 is adapted for cooperation with the guide surface 21 of the L-shaped base structure 20, while the rollers 220 are adapted for cooperation with the guide surface 22 of the base structure 20.

As shown primarily in Figs. 1, 3, and 7, an elongated bracket member 221 is secured to the upper portion of the vertically extending portion 217 of the carriage member 210 by means of screws 222. The bracket 221 extends rearwardly from the upper surface of the carriage member 210, in spaced relationship to the guide surface 22 of the base member 20 and downwardly, terminating in a brace portion 223. The inner face of the brace portion 223 is spaced from a rearward surface 224 of base member 20, there being a plurality of guide buttons 225 disposed in openings 226 through the portion 23, with the faces of the buttons 225 being adapted for sliding engagement with the surface 224 of the base structure 20. Thus, the carriage C is adapted for longitudinal movement on the guide surfaces 21 and 22 and is maintained in contact with these surfaces by engagement of the faces of the buttons 225 with the surface 224. It is to be noted that the axes of the shafts 219 which support the rollers 220 lie in a plane that extends horizontally through the axis of the spindle 31. Furthermore, it is to be noted that the 3-point roller suspension for the carriage C is arranged in such a manner as to prevent any inadvertent axial movement being applied to the winding head H during the passage of the rollers 215 and 220 over the surfaces 21 and 22 respectively. In this connection, it is to be noted that any slight imperfections in the surface 21 will merely create a rotary component upon the winding head H through action of the roller 215 and the carriage C. This same rotary component will be applied to the head with any slight imperfections in the surface 22, due to the lateral spacing thereof from the center of rotation of the head. Additionally, any rocking motion, that may be transmitted to the head by reason of the outwardly spaced rollers 220 will merely act to transmit a substantially vertical component to the head at the point of winding of the wire W about the support material M. Thus, the spacing between the wires being wound about the support material may accurately be maintained with no significant variations in axial movement of the head being experienced by reason of the engagement of the rollers 215 and 220 with their respective guiding surfaces.

With reference now to Figs. 1, 3, and 7, the carriage C and consequently the head H is operatively connected for engagement with the leadscrew 200 by means of a bracket 230 that is connected to the bracket 221 by means of screws 231. The bracket 230 has downwardly extending side plates 232 which extend about the upper and side portions of the leadscrew 200. The bracket 230 is also provided with a vertical opening 233 therein, in which is positioned a stub shaft 234 that is in turn connected to a split nut 235. Internal threads 236 on the split nut 235 are adapted for co-operation with the threads 237 on the lead screw 200 and, through engagement of ends of the nut 235 with the side plates 232, the longitudinal movement of the winding head may be transmitted from the leadscrew 200 through the brackets 230 and 221 to the carriage member 210.

As shown primarily in Figs. 1, 3, 6, and 7, the split nut 235 is adapted for movement out of engagement with the leadscrew 200 by means of a lever 240 that is disposed on the outer surface of the portion 217 of the carriage member 210. The lever 240 is connected to a shaft 241 that extends laterally through the portion 217 of the carriage member 210 with the rearward end thereof having an upwardly directed flattened portion indicated at 242, Fig. 3. The flattened portion 242 is adapted for cooperation with a leaf member 243 which in turn cooperates with lower edges of downwardly extending side portions 244 formed on the split nut 235. Accordingly, upon rotation of the shaft 241, in a clockwise direction as seen in Fig. 6, and by means of the handle 240, the leaf member 243, which is anchored at 245 to the bracket 221, will be raised whereby to engage the portions 244 of the split nut 235 and move the nut out of engagement with the threads of the leadscrew 200. The stub shaft 234, which is slidably mounted in the opening 233 of the bracket 230, serves to guide the vertical travel of the split nut. Additionally, the split nut is limited in longitudinal movement by engagement of the sides thereof with the side plates 232 which depend downwardly from the bracket 230. Rotation of the shaft 241 is limited by means of a stop pin 246 that is disposed outwardly from the portion 217 of the carriage member 210.

In operation of the present device, a length of support material or card M is placed in position as hereinbefore described, the split nut 235 is moved out of engagement with the leadscrew 200 and the carriage is manually positioned at a leftward end of the support material, as viewed in Figs. 1 and 4. The wire W from the bobbin 88 is threaded about the pulley 100, the second pulley 110, and the guide pulley 120 and is started on the support material as by taping the end of the wire to the support material. The split nut 235 is next moved into engagement with the threads of the leadscrew 200. Rotation of the splined shaft 142 is then started which will rotate the main driving gear 46 of the head H thereafter to deposit the wire in spaced convolutions about the support material M. As the wire is being placed upon the support material M, tension varying requirements are presented at the support material, in order that the wire may be tightly wound thereon and that not only the pitch of the convolutions but also the spacing between convolutions may be maintained in a precise and accurate manner. This precisely necessary tension on the wire is maintained by means of the brake linkage defined by the ring 112 and the frictional braking member 82 in its engagement with the braking ring 91, and thereafter the engagement of the frictional braking material 95 with the surface 90 of the member 87. As stated hereinbefore, the tendency of the O-rings 77, on the frictional engagement member 82, is to rotate the ring 91 together with the bobbin 88 in a direction opposite from the direction of rotation of the winding head. Thus, a constant reverse tension is applied to the wire leaving the bobbin. However, it is to be noted that the bobbin 88 is mounted on the member 87 and that these two components are freely rotatably journalled independent from the winding head and the gear driven arrangements thereof. Accordingly, the wire W is free to be drawn from the bobbin 88. In the event of increased tension requirements in the wire, at a position thereof as being wound about the support material, the tension spring 114, connected to the shaft 111 which supports the pulley 110, will tend to move the ring 112 in a counter-clockwise direction whereby to increase the tension on the wire by reason of its passage about the pulley 110 and to move the bar 68 in a slight counterclockwise direction. Inasmuch as the frictional pressure member 82 is carried by the shaft 71, which is in turn journalled in the bar 68, this slight circumferential movement of the ring 112 will cause a slight inward radial movement of the frictional engagement member 82 relative to the braking ring 91, by reason of the slightly offset centers with respect to the axes of the shafts 68 and 65, as shown primarily in Fig. 7. Upon slight radial movement of the frictional engagement member 82, and the O-rings 77 carried thereby, the braking ring 91 and the frictional material 95 carried thereby will be moved into tighter engagement with the surface 90 of the member 87, whereby to increase the tendency for the bobbin 88 to be driven in a direction opposite from that of the rotation of the head H. Thus, additional resistance to unwinding of the wire from the bobbin 88 will be experienced in accordance with the requirements of tension in the area of winding about the support material M. Additionally, any major undue slack, or lack of tension in the wire W immediately upon leaving the bobbin 88, will be taken up by action of the arm 101 and tension spring 105 in controlling the tension on the wire in passage thereof about the first pulley 100.

In connection with the winding of the wire about the support material M, another important feature of the present invention is the guiding of the wire in the area immediately adjacent to the support material. As shown primarily in Fig. 12, it is to be noted that the wire W leaves the guide pulley 120 and thereafter contacts the inner end of the bevel face 41 of the element 34, and specifically the bend as indicated at 42 thereon. The wire thereby extends radially with respect to the axis of rotation of the head H for application about the support material M.

Furthermore, as shown in Fig. 2, it is to be noted that a successive plurality of resistance elements may be wound on a single strip of support material M by spacing the various groups of windings therealong by continuous action of rotation. This is accomplished by completely winding one resistance element, thereafter releasing the split nut 235 from the threads 237 of the leadscrew 200, and manually moving the head along the support material for a few turns before commencing the winding of a next adjacent resistance element. It has been found that the accuracy of the present apparatus is such as to enable the winding of wire in the nature of .001" in diameter about a support material, and to place a given number of windings about the support material, say, for example, five hundred windings in a five-eighths inch length, and to repeat this operation with but a variance of approximately one-half a winding as between successive resistance elements. Additionally, the pitch of the windings, together with the spacing between the windings, may accurately be maintained and accurately duplicated in successive resistance elements by reason of the novel support arrangement for the winding head and the novel means for delivering, guiding and maintaining the tension on the wire in its travel from the bobbin 88 to the position of winding about the support material.

Additionally, the number of windings about the support material in a given length may accurately be maintained by reason of the frictional driving arrangement between the O-ring 82 and the conical surface 190 of the driving wheel 191. The arrangement and means for positioning the O-ring with respect to the driving surface 190 is such as to prevent any undesirable scuffing of the driving O-ring 182 relative to the conical surface 190, which would otherwise prevent exact duplication of successive resistance elements. As discussed hereinbefore, the position of the O-ring 182, relative to its circumferential relationship with respect to the driving wheel 191, may be altered through use of the micrometer adjustment 186. In this connection, a practice has been established to release the tensions on the thumb screws 168 and 172 and manually move the shaft 161 into the bore 162 against the compression of the spring 163. Thereafter, the sleeve 157 may manually be moved inwardly or outwardly relative to the driving wheel 191 and the micrometer adjustment arrangement be used to check the proper position desired. When the proper radial position of the O-ring 182 relative to the driving wheel 191 is established, the compression spring 163 is permitted to position the O-ring 182 against the surface 190 and the thumb screws 168 and 172 are again tightened, thereby taking the effect of the compression spring 163 out of the mechanism for supporting the O-ring 182 relative to the surface 190. This particular system allows infinite variation in the pitch of the windings about the support material, by infinitely varying the speed of rotation of the leadscrew independently from the speed of rotation of the splined driving shaft 142. This action serves thereby to change the speed of longitudinal movement of the winding head H relative to the support material independently from the speed of rotation thereof. It is to be noted that the apex of the cone, in which the surface 190 lies, will be on an axis of the shaft 175 when the O-ring 182 is positioned in a radial central area of the surface 190. Accordingly, inasmuch as the driving wheel 191 is of substantial diameter, positioning of the O-ring 182 radially on either side of this central area of the surface 190 will permit extremely little if any scuffing of the O-ring relative to the surface 190. Obviously, the O-ring 182 may be replaced as wear occurs and readjustment may be accomplished merely by loosening the thumb screws 168 and 172 to establish the proper compression of the O-ring against the surface 190.

Any substantial changes in the desired pitch of the windings about the support material M over those changes which may be accomplished by means of the variable ratio transmission drive D, established by the O-ring 182 and surface 190, may be accomplished by changing the gears 150 and 152.

In the event that it is desired to remove windings from the support material, as previously described, it is only necessary that the gear 54 be moved out of engagement with the teeth 60 and the gear 55 be moved into engagement with the teeth 61. This change in the gear relationships enables rotation of the frictional driving member 82 at a somewhat higher speed than is experienced in forward driving, and upon reverse driving of the spline shaft 142, the winding head may be rotated in an opposite direction, the windings thereby being taken from the support material and replaced on the bobbin 88. Such reverse operation of the winding apparatus is often desirable in the event that an operator winds an excessive number of convolutions about the support material. In this connection, it is to be noted that the bobbin 88 will be driven at a speed somewhat higher than the speed at which the wire leaves the support material in order to insure proper winding thereof back upon the bobbin. Furthermore, it is to be noted that the braking arrangement, defined by the ring 112 and frictional driving member 82, together with the braking ring 91 and frictional material 95, also serves to operate in much the same manner as hereinbefore described when the present apparatus is operated in a reverse direction. Accordingly, little breakage of the wire W is experienced with the device of the present invention, thereby conserving such wire and enabling continuous production and operation of the winding device without undue time being spent in rethreading extremely fine wire about the various pulleys 100, 110, 120 and about the support material M.

Having thus described the invention and the present embodiment thereof, it is desired to emphasize the fact that many modifications may be resorted to in a manner limited only by a just interpretation of the following claims.

What is claimed is:

1. In a wire winding apparatus: a winding head; a carriage for said head; a spindle carried by said carriage, said spindle being positioned in longitudinal slidable engagement with a wire support; a rotatable driven member journalled on said spindle; a bobbin independently journalled on said spindle adjacent an outer end thereof; frictional material operatively connected to said bobbin; a brake member disposed about said frictional material; driving means operatively connected with said driven member in a manner to rotate said brake member in a direction opposite from that of said driven member; a brake control linkage carried by said driven member; and means for guiding wire from said bobbin onto said support, a portion thereof acting as a sensing element for the tension of said wire passing thereover, said portion of said wire guiding means being carried by said brake control linkage and operatively connected with said driving means, whereby to effect movement of said brake member toward said frictional material thereby to urge rotation of said bobbin in a direction opposite from that of said driven member in response to the tension of said wire at said support as sensed by said portion of said means for guiding said wire.

2. In a wire winding apparatus, a carriage, a winding head disposed on said carriage, said winding head comprising: a spindle carried by said carriage, said spindle being positioned in longitudinal slidable engagement with a wire support; a rotatable driven member journalled on said spindle; a bobbin independently journalled on said spindle adjacent an outer end thereof; a frictional material operatively connected to said bobbin; a brake member disposed about said frictional material; gear transmission driving means disposed between said driven member and said brake member for rotating said brake member in a direction opposite from that of said driven member; a brake control linkage carried by said driven member; and means for guiding wire from said bobbin onto said support, a portion thereof acting as a sensing element for the tension of said wire passing thereover, said portion of said wire guiding means being carried by said brake control linkage and operatively connected with said driving means, whereby to effect movement of said brake member toward said frictional material thereby to urge rotation of said bobbin in a direction opposite from that of said driven member in response to the tension of said wire at said support as sensed by said portion of said means for guiding said wire.

3. In a wire winding apparatus: a winding head; a carriage for said head; a spindle carried by said carriage, said spindle being positioned in longitudinal slidable engagement with a wire support; a rotatable driven member journalled on said spindle; a bobbin independently journalled on said spindle adjacent on the outer end thereof; frictional material operatively connected to said bobbin; a brake member disposed about said frictional material; driving means operatively connected with said driven member in a manner to rotate said brake member in a direction opposite from that of said driven member; a brake control linkage carried by said driven member; and means for guiding wire from said bobbin onto said support, a portion thereof including a conical face formed on said spindle adjacent said support, another portion thereof acting as a sensing element for the tension of said wire passing thereover, said last mentioned portion of said wire guiding means being carried by said brake control linkage and operatively connected with said driving means, whereby to effect movement of said braking member toward said frictional material thereby to urge rotation of said bobbin in a direction opposite from that of said driven member in response to the tension of said wire at said support as sensed by said last mentioned portion of said means for guiding said wire.

4. In a wire winding apparatus, a carriage, a winding head disposed on said carriage, said winding head comprising: a spindle carried by said carriage, said spindle being positioned in longitudinal slidable engagement with a wire support; a rotatable driven member journalled on said spindle; a bobbin independently journalled on said spindle adjacent an outer end thereof; frictional material operatively connected to said bobbin; a brake member disposed about said frictional material; gear transmission driving means disposed between said driven member and said brake member for rotating said brake member in a direction opposite from that of said driven member; a brake control linkage carried by said driven member; and means for guiding wire from said bobbin onto said support, a portion thereof including a conical face formed on said spindle adjacent said support, another portion thereof acting as a sensing element for the tension of said wire passing thereover, said last mentioned portion of said wire guiding means being carried by said brake control linkage and operatively connected with said driving means, whereby to effect movement of said brake member toward said frictional material thereby to urge rotation of said bobbin in a direction opposite from that of said driven member in response to the tension of said wire passing over said conical face and at said support, as sensed by said last mentioned portion of said means for guiding said wire.

References Cited in the file of this patent

UNITED STATES PATENTS

| 2,186,820 | Chapman | Jan. 9, 1940 |
| 2,360,960 | Martindell | Oct. 24, 1944 |
| 2,393,548 | McCoy | Jan. 22, 1946 |
| 2,406,846 | Muller | Sept. 3, 1946 |
| 2,471,580 | Perrault et al. | May 31, 1949 |
| 2,569,292 | Dehmel | Sept. 25, 1951 |
| 2,643,068 | Harris | June 23, 1953 |